3,338,980
PROCESS FOR THE PREPARATION OF FLUORO-OLEFINES BY PYROLYSIS
Franco Gozzo, Saronno, Varese, and Mario Ragazzini, Milan, Italy, assignors, by mesne assignments, to Montecatini Edison S.p.A., Milan, Italy, a corporation of Italy
No Drawing. Filed Sept. 17, 1963, Ser. No. 309,382
Claims priority, application Italy, Sept. 20, 1962, 18,520/62
6 Claims. (Cl. 260—653.3)

The present invention relates to a process for the preparation of tetrafluoro-ethylene, and more particularly it concerns a process for the preparation of tetrafluoro-ethylene by pyrolysis of monochloro-difluoromethane.

It is known to prepare tetrafluoro-ethylene by pyrolysis of monochlorodifluoromethane in platinum tubes at temperatures ranging from 650° C. to 900° C. and by subsequent washing of the gaseous mixture thus obtained with water, to eliminate the hydrogen chloride formed during the pyrolysis reaction:

$$2CF_2HCl \rightarrow CF_2=CF_2 + 2HCl$$

Subsequently, the gaseous mixture is dried and subjected to distillation. These known processes, however, suffer from disadvantages such as the necessity of effecting the pyrolysis in a reactor built of relatively expensive materials capable of resisting the attack of the reaction products at the high pyrolysis temperatures, such as, for example, platinum.

Another disadvantage lies in the solubility of the monochlorodifluoromethane in water; as a matter of fact, during the washing phase of the pyrolysis gases with water, to eliminate hydrogen chloride formed in the reaction, monochlorodifluoromethane, which is always present in appreciable quantities in the pyrolysis gas is partially dissolved by the washing water and therefore cannot be fully recovered.

An object of the present invention is, therefore, to provide a process for the preparation of tetrafluoroethylene which does not require the use of a pyrolysis furnace built of very expensive materials such as platinum. Another object of the present invention is the provision of a process wherein no corrosion of the walls of the pyrolysis apparatus occurs, so that the latter may be built of relatively inexpensive materials such as nickel and its alloys.

Still another object of this invention is to provide a process which substantially eliminates the need for a water washing step, thereby achieving the advantages of limiting to a considerable extent the losses of monochlorodifluoromethane by dissolution in water, eliminating the need of washing equipment hence providing additional economic advantages.

A further object is to provide a process wherein higher conversion rates of monochlorodifluoromethane are achieved with higher net yields in tetrafluoroethylene.

These and other objects and advantages will be readily observable from the following more detailed description of the process.

In accordance with the invention, a process is provided for the preparation of tetrafluoroethylene comprising pyrolyzing monochlorodifluoromethane in the presence of a basic nitrogenous compound. The basic nitrogenous compound reacts with the hydrogen chloride freed during the pyrolysis of the monochlorodifluoromethane to form the corresponding nitrogenous chloride. Upon completion of the reaction, i.e. the reaction of all of the freed hydrogen chloride with the basic nitrogenous compound, the gaseous mixture is quenched with water and the nitrogenous chloride compound removed.

The tetrafluoroethylene may then be recovered from the reaction mixture by conventional techniques, e.g. fractional distillation. While other basic nitrogenous compounds may be used, for economic reasons gaseous ammonia is preferred.

Operating according to the procedures previously described, it was surprisingly found that at an equal temperature of the outside walls of the pyrolysis reactor, the reaction rate is considerably increased and that simultaneously higher conversions of the monochlorodifluoromethane and higher net yields of tetrafluoroethylene are obtained with respect to the known processes.

Furthermore, operating according to the invention, it was found also that, as building materials for the pyrolysis chamber, it is possible to use nickel or its alloys such as Monel and Hastelloy, without their suffering appreciably from corrosion. The use of highly expensive materials, e.g. platinum, in the construction of such pyrolysis chambers which has heretofore been necessary in the known processes is eliminated.

When considering the thermal decomposition reaction of the monochlorodifluoromethane, one must keep in mind the monochlorodifluoromethane conversion that represents the percentage of monochlorodifluoromethane which has reacted and the net yield in tetrafluoro-ethylene which represents the percentage of tetrafluoro-ethylene obtained in comparison to that obtainable theoretically on the basis of the monochlorodifluoromethane which has reacted.

Both the conversion and the net yield depend mainly on the pyrolysis conditions, that is, on the temperature and on the residence time of the gases in the pyrolysis chamber. Obviously there shall be chosen the pyrolysis conditions which ensure the best conversion and the best net yield. Having on this base fixed the pyrolysis conditions, the quantity of ammonia that, according to the present invention, must be admixed to the monochlorodifluoromethane, must be such as to react with all the hydrogen chloride that is released by the reaction, though it would not be detrimental to the reaction to use a quantity of ammonia in slight excess or defect.

At the end, since the quantity of ammonia depends on the conversion and this latter in its turn depends on the temperature and on the heating time, it turns out that the quantiy of ammonia depends on the reaction conditions. In other words, the quantity of ammonia introduced into the pyrolysis chamber must be such that on the outlet side of the pyrolysis chamber a substantially neutral gaseous mixture is obtained.

However, in order to completely avoid the danger of corosion of the equipment through the action of the hydrogen chloride, it is preferred to operate with a slight excess of ammonia. It has been found that such an excess does not prejudice the course of the reaction; furthermore, this excess of ammonia can be easily eliminated by washing the gaseous mixture either with water or sulphuric acid. Moreover, it was also found that small quantities of ammonia are useful in preventing polymerization of the tetrafluoroethylene during the storage of the raw reaction mixture; on the other hand these small quantities of ammonia are easily eliminated during the successive distillation.

At temperatures ranging from 650° C. and 900° C., but preferably from 700° C. and 800° C., and with a resting time below 0.6 second, but preferably with times comprised between 0.02 and 0.2 second, conversions of between 20% and 60% and net yields above 89–90% are obtained. Under such conditions, molar ratios of ammonia:monochlorodifluoromethane comprised between 0.2 and 0.7 may be used.

At the outlet side of the pyrolysis chamber the gases still containing ammonium chloride are subjected to a quenching and to the separation of the ammonium chloride.

Although it is possible to carry out both operations separately, it is preferred to quench the gaseous mixture in the same apparatus in which the ammonium chloride must be separated from the gaseous mixture, by operating, for instance, in a cyclone separator. Operating at a pressure of 1 absolute atmosphere it is preferred, for a more smooth course of the separating operations, to introduce the gaseous mixture into the cyclone separator at a temperature not less than 350° C. and to effect such a cooling as to bring the temperature of the outflowing gases down to 40–50° C.

The inventive idea of the present invention will be more clearly understood by reference to the following examples:

*Example 1*

A gaseous mixture consisting of 61.8% in volume of $CF_2HCl$ and of 38.2% of $NH_3$ was made to flow through a nickel pipe of 6 mm. internal diameter and 1,100 mm. length, at a flow rate of 262 gr./hr. The pipe was kept at a temperature of 710° C. by means of electric heating for an intermediate length of 300 mm. while upstream and downstream of this hot zone two closed nickel cylinder of a diameter slightly lower than 6 mm. were inserted into the pyrolysis tube, so as to pre-heat the gas at the input and minimize the contact time of the gas outside the reaction zone. The operational absolute pressure in this latter zone was of 735 mm. Hg.

The contact time was calculated on the basis of the volume of the reaction zone which amounted to 8.5 cc. and on the flow rate in volume of the gaseous mixture supposed to be at the temperature measured on the external wall of the pyrolysis tube. In this example the contact time, thus calculated, amount to about 0.084 second.

Immediately at the outlet of the oven the pyrolysis tube was connected to a cyclone from whose upper part the gas was flowing to enter a sulphuric acid bubbler and to be then condensed in a liquid air trap. After 42 minutes from the start of the reactions, 163.7 gr. of $CF_2HCl$ and 19.8 gr. of $NH_3$ had passed through.

At the outlet of the cyclone were collected 41.6 gr. of $NH_4Cl$; in the condenser at −190° C. were collected 135 grs. of a product which, at the chromatographic quantitative analysis, it was found to contain 95.9 gr. of unchanged monochlorodifluoromethane and 36.7 gr. of tetrafluoroethylene, the remainder consisting of by-products. This was equivalent to a conversion of 41.4% and a net yield of 93.5%.

*Example 2*

A gaseous mixture consisting of 122.2 gr. of $CF_2HCl$ and 14.3 gr. of $NH_3$ was passed through a pyrolysis apparatus similar to that described in Example 1, for 35 minutes.

In the reaction zone the temperature was 730° C. and the absolute pressure was 786 mm. Hg. The contact time calculated with the system used in Example 1, was found to be 0.093 second.

The product flowing out of the pyrolysis furnace, after separating of the ammonium chloride by quenching in the separating cyclone was bubbled through sulphuric acid and then condensed in liquid air. 94 gr. of an organic product were thus collected, which an analysis turned out to consist of 33.5 gr. of $C_2F_4$, 57.4 gr. of $CF_2HCl$ and 3.1 gr. of by-products. This was equivalent to a conversion of the monochlorodifluoromethane equal to 53% and to a net yield of 89.4% of $C_2F_4$.

*Example 3*

A gaseous mixture consisting of 187.1 gr. of $CF_2HCl$ and 20 gr. of $NH_3$ was made to flow for 30 minutes through a pyrolysis apparatus equal to that described in Example 1. In the reaction zone the temperature measured on the external wall was 750° C. and the absolute pressure amounted to 782 mm. Hg. The contact time calculated in the same way as in the previous examples was of about 0.057 second. The product flowing out of the pyrolysis furnace was passed through a cyclone whose inflow side was kept at 390° C., while the outlet of the cyclone was maintained at room temperature. The gas coming from the cyclone was bubbled in a smaller vessel containing water and was then condensed in a trap at −190° C.

At the end of the test 62.8 gr. of $NH_4Cl$ powder were collected at the outlet of the separator. The water of the bubbler was found to contain 1 gr. of HCl.

The organic product condensed weighed 142.6 gr. and at the analysis was found to contain 81.4 gr. of non-reacted $CF_2HCl$ and 55 gr. of $C_2F_4$. This corresponded to a conversion of 56.5% and to a net yield of 90%.

*Example 4*

A gaseous mixture consisting of 209.7 gr. of $CF_2HCl$ and 15.4 gr. of $NH_3$ was made to flow through a pyrolysis tube equal to that used in Example 1 and maintained at a temperature of 710° C.

The contact time of the reactants in the hot reaction zone, calculated in the usual way, was found to be 0.058 second, absolute pressure being kept at 800 mm. Hg. The gas thus produced was made to flow through a powder separator as in the preceding examples and was then directly condensed in a liquid air trap. After 29 minutes from the start of the test, 41 gr. of ammonium chloride were collected at the discharge end of the cyclone as well as 184 gr. of organic product containing a small amount of ammonia were collected in the trap kept at −190° C. For analytical purpose this organic product was evaporated and bubbled in a sulphuric acid Drecsel in order to separate the ammonia, and finally it was again condensed thereby. 183 gr. of an organic mixture were collected, a sample of which on analysis showed the following composition expressed in molar percentages:

|  | Percent |
|---|---|
| $C_2F_4$ | 19.5 |
| $CF_2HCl$ | 79.9 |
| By-products | 0.6 |

These values corresponded to a conversion of 32% and to a net yield of 97%.

*Example 5*

For purpose of comparison, some of the results obtained in the pyrolysis of monochlorodifluoromethane alone or in the presence of ammonia, by using the same equipment described in the preceding examples, are set out in Table 1.

To render the results comparable, and particularly the net yield and the contact time, these tests were effected at very similar temperature and pressure conditions and in such a way as to obtain the same conversion both in the presence as well as in the absence of ammonia.

TABLE 1

| Test No. | Composition by volume of the gas to be pyrolized | Reaction zone | | | Conversion, percent | Net yield, percent | NiCl$_2$ deposit on internal walls of pyrolysis tube after 3 hrs. of reaction |
|---|---|---|---|---|---|---|---|
| | | T., °C. | P., mm. Hg | Contact time, sec. | | | |
| 1 | CF$_2$HCl, 100% | 710 | 809 | 0.100 | 39.5 | 90 | Heavy. |
| 2 | {CF$_2$HCl, 71%  NH$_3$, 29%} | 710 | 804 | 0.080 | 39 | 94 | Absent. |
| 3 | CF$_2$HCl, 100% | 730 | 755 | 0.122 | 53.7 | 79.6 | Heavy. |
| 4 | {CF$_2$HCl, 62.7%  NH$_3$, 37.3%} | 730 | 786 | 0.093 | 53.3 | 89 | Absent. |
| 5 | CF$_2$HCl, 100% | 750 | 785 | 0.085 | 56.5 | 86 | Heavy. |
| 6 | {CF$_2$HCl, 66.2%  NH$_3$, 33.8%} | 750 | 782 | 0.057 | 56.5 | 90 | Absent. |

It will be appreciated that the present inventive scope encompasses various applications in the pyrolysis of halogenated hydrocarbons other than monochlorodifluoromethane, in which the presence of a gas of basic reaction would bring a real advantage in the yield of the product that is intended to be prepared.

This would be the case of the pyrolyses of many compounds in which an atom of hydrogen and a halogen atom are attached to the same carbon atom and/or to carbon atoms immediately nearly, such as for instance in CBrHF$_2$, CBr$_2$HF, CCl$_2$HF, CHF$_3$, CHF$_2$—CHFCl, CHF$_2$—CF$_2$Cl, CHF$_2$—CHF$_2$, CHF$_2$—CF$_3$, from which it appears possible to eliminate an hydrogen halide. Furthermore, the combination of this acid with the basic gas introduced at the beginning may lead to products of considerable economical value.

In the case of the pyrolysis of CHF$_3$ in the presence of ammonia, one will for instance obtain, through the cooling of the reaction gases, formation of ammonium fluoride or difluoride precipitate, just depending on the quantity of ammonia used.

Eventual applications are not limited only to the field of the compounds with one or two carbon atoms but might be extended also to compounds having longer chain, to cyclic compounds, saturated and unsaturated, to compounds constituted of aromatic rings attached to aliphatic hydrohalogenated groups or to compounds from which the fission of one or more molecules of hydrogen halide—leads to the formation of aromatic derivatives.

Another extension of the principle of the present invention may be found in substituting for the ammonia an aliphatic or aromatic amine or any compound containing a basic group.

Finally, the operation of the separation of the product of the combination of the hydrogen halide with the basic gas introduced at the start, from the organic components of the pyrolysis mixture may be carried out by any means different from those indicated in the text, without thereby falling without the scope of the invention. For instance, in the case that the pyrolysis is effected on monochlorodifluoromethane or on fluoroform in the presence of ammonia, the solid ammonium halide may be separated from the organic mixture by means of electrostatic precipitation.

In the case that an ammonium fluoride is formed at the outlet of the pyrolysis chamber, a convenient method of separation consists in condensing the vapours of said fluoride at the liquid state with a subsequent solidification on a cold wall.

We claim:

1. A process for preparing tetrafluoroethylene comprising pyrolyzing monochlorodifluoromethane in the presence of ammonia.

2. The process defined in claim 1, wherein the molar ratio between ammonia and monochlorodifluoromethane is between about 0.2 and 0.7, the pyrolysis temperature is between about 650° and 900° C. and the pyrolysis time is less than 0.6 second.

3. The process defined in claim 2 wherein the temperature of pyrolysis is maintained between about 700° C. and 800° C.

4. The process defined in claim 2 wherein the time of pyrolysis is comprised between about 0.2 and 0.02 second.

5. A process for preparing tetrafluoroethylene comprising pyrolyzing monochlorodifluoromethane in the presence of gaseous ammonia, said monochlorodifluoromethane and ammonia being present in a molar ratio between about 0.2 and 0.7; maintaining the pyrolysis temperature between about 650° C. and 900° C., the pyrolysis time being less than 0.6 second and removing ammonium chloride formed during the reaction.

6. The process defined in claim 5 wherein the ammonium chloride, which forms by reaction of the ammonia with hydrogen chloride released during the pyrolysis of the monochlorodifluoromethane, is eliminated from the gaseous reaction mixture by washing the latter with water.

References Cited

UNITED STATES PATENTS 2,994,723  8/1961  Scherer et al. _____ 260—653.3

FOREIGN PATENTS 805,816  12/1958  Great Britain.
1,168,314  12/1958  France.

OTHER REFERENCES

Tarrant et al.: J. Am. Chem. Soc. 76, 1954, 2343–2345.
Tarrant et al.: J. Am. Chem. Soc. 76, 1954, 3466–3467.
Tarrant et al.: J. Am. Chem. Soc. 77, 1955, 2783–2787.

LEON ZITVER, *Primary Examiner.*

DANIEL D. HORWITZ, *Assistant Examiner.*